(12) United States Patent
Nishigaki

(10) Patent No.: US 7,909,681 B2
(45) Date of Patent: Mar. 22, 2011

(54) CHAINSAW SETTING MACHINE

(75) Inventor: Takanobu Nishigaki, Miki (JP)

(73) Assignee: Nishigaki Industrial Co., Ltd., Hyogo (JP)

( * ) Notice: Subject to any disclaimer, the term of this patent is extended or adjusted under 35 U.S.C. 154(b) by 0 days.

(21) Appl. No.: 10/559,144

(22) PCT Filed: Apr. 19, 2004

(86) PCT No.: PCT/JP2004/005570
§ 371 (c)(1),
(2), (4) Date: Dec. 3, 2005

(87) PCT Pub. No.: WO2005/102577
PCT Pub. Date: Nov. 3, 2005

(65) Prior Publication Data
US 2006/0137489 A1    Jun. 29, 2006

(51) Int. Cl.
*B24B 23/00* (2006.01)
(52) U.S. Cl. ......... 451/419; 451/349; 451/439; 451/545
(58) Field of Classification Search .............. 451/349, 451/358, 124, 120, 241, 233, 234, 439, 545, 451/420, 419; 76/25.1, 36, 37, 74
See application file for complete search history.

(56) References Cited

U.S. PATENT DOCUMENTS

| | | | |
|---|---|---|---|
| 2,770,985 A * | 11/1956 | Pearce | 76/37 |
| 2,989,782 A | 8/1959 | Consoletti | |
| 3,172,307 A | 3/1965 | Kephart, Jr. | |
| 3,354,753 A * | 11/1967 | Kennemore | 76/37 |
| 3,744,349 A * | 7/1973 | Juncker | 76/80.5 |
| 3,768,341 A | 10/1973 | Fitzpatrick | |
| 3,905,118 A | 9/1975 | Ballew | |
| 4,019,407 A * | 4/1977 | Penberthy | 76/37 |
| 4,131,038 A | 12/1978 | Beerens | |
| 4,173,908 A * | 11/1979 | Aksamit | 76/80.5 |
| 4,277,987 A * | 7/1981 | Hyde | 76/80.5 |
| 4,440,045 A * | 4/1984 | Aksamit | 76/80.5 |

FOREIGN PATENT DOCUMENTS

| | | |
|---|---|---|
| JP | 55-101319 | 2/1980 |
| JP | 55-89519 | 6/1980 |
| JP | 57-186227 | 11/1982 |
| JP | 60-131325 | 9/1985 |
| JP | 61-24121 | 2/1986 |

* cited by examiner

*Primary Examiner* — Robert Rose
(74) *Attorney, Agent, or Firm* — Apex Juris, pllc; Tracy M Heims

(57) ABSTRACT

A chainsaw sharpener mounted on and forward of the electric motor of a sharpener body (2) via a mounting portion (9) having a guide body (8) with an upper plate face (80) and wall faces (81*a* to 81*e*) which have a substantial X-shape as seen in plan view, and which are fit into and along an upper part of the saw chain in alignment with a sharpening angle of either a left or right cutter blade (31, 32) of a saw chain (30). Formed at a substantially central surface of the guide body (8) is an exposure portion made of openings (85, 86) which make it possible to watch, from above, the grinding tool (7) and a cutting edge of a cutter blade to be sharpened. A guide portion (87) presses, from above, the cutter blade to be sharpened so as to prevent the cutter blade from wobbling or tilting, and further to define an accurate cutting edge angle.

1 Claim, 8 Drawing Sheets

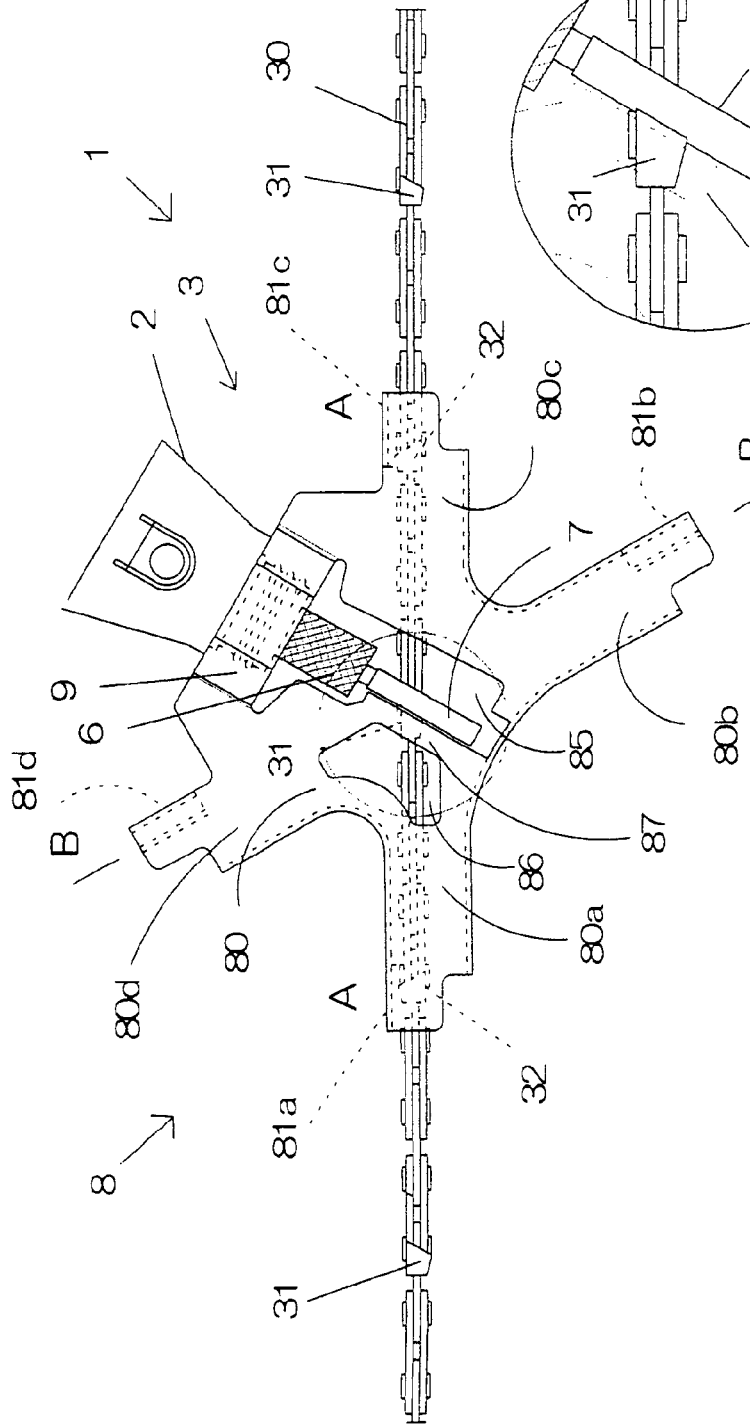
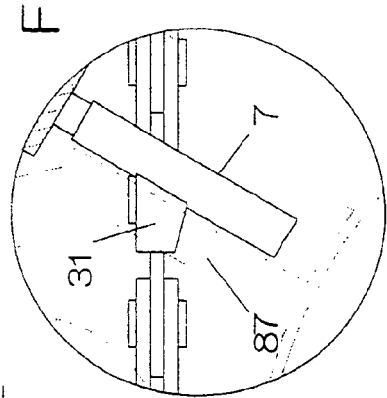
FIG. 7A
FIG. 7B

CHAINSAW SETTING MACHINE

TECHNICAL FIELD

The present invention relates to a chainsaw sharpener in which a round shaft-shaped grinding tool attached to an end of an electric motor is rotated to grind and thereby sharpen, at a side portion thereof, a cutting edge of a cutter blade of a saw chain provided on a chainsaw. It particularly relates to a chainsaw sharpener which enables sharpening, aligned with an accurate sharpening angle and cutting edge angle, easily in a short time with just a simple operation of fitting it from above into the saw chain in an orientation corresponding to either a left or right cutter blade, and pushing it forward.

BACKGROUND ART

Conventionally, a chainsaw has attached thereto a saw chain having an endless shape. The saw chain has left-facing cutter blades and right-facing cutter blades provided at constant intervals and in directions opposite to each other. Upper blades of these blades have a sharpening angle which is, for example, tilted backward at 30°. Cutting edges of the upper blades have a cutting edge angle of, for example, 60°.

These sharpening angle and cutting edge angle are required for cutting e.g. a wood. If a cutting edge is chipped or worn, it becomes dull. This may cause extra time required to cut a wood, and provide extra load on a worker, and further prevent the saw chain from biting into the wood sufficiently at the time of starting cutting the wood, which may bring about a dangerous situation of kickback (backlash).

For this reason, it is necessary to grind so that the cutting edge becomes sharp. In the following description, sharpening means grinding of a cutting edge aligned with the sharpening angle and the cutting edge angle.

Conventionally, this sharpening has been done by manual work using e.g. a round shaft file. However, the sharpening by manual work is low in efficiency, and in particular requires expertise to align a file with an accurate sharpening angle and cutting edge angle. If the sharpening angle or the cutting edge angle is not accurate when cutting a thick tree, it may not be possible to cut it straight, or it may cause a dull cutting edge. A technology to hold a file in alignment with an accurate sharpening angle or cutting edge angle is known from e.g. Japanese Patent Publication Sho 44-29030 which discloses a sharpening process for a chainsaw. This sharpening process uses a method of fixing a holder for holding a file to a saw plate using a thumbscrew. Thus, this requires laborious work of loosening and tightening the thumbscrew every time when sharpening each cutter blade.

Recently, instead of sharpening by manual work, a sharpener with a handy type electric motor is more often used.

Known examples of this kind of sharpeners are e.g. an upper blade grinder for a chainsaw as described in Japanese Laid-open Patent Publication Sho 61-24121, and a chainsaw sharpener not requiring a grinding tool as described in Japanese Laid-open Utility Model Publication Sho 57-186227.

DISCLOSURE OF INVENTION

However, the grinder described in Patent Document 2 (sic Japanese Laid-open Patent Publication Sho 61-24121) and the sharpener described in Utility Model Document 3 (sic Japanese Laid-open Utility Model Publication Sho 57-186227) are used in a manner that a holder or a motor is held by a hand, while a cover plate or an angle adjustment plate is placed on a saw chain. It is understood that mere placing of the cover plate or the angle adjustment plate on the saw chain is not sufficient to stabilize the posture of the grinder or the sharpener, and that a hand is likely to wobble during the sharpening work, and thus that it is not easy to continue the sharpening work in alignment with an accurate sharpening angle or cutting edge angle. An attempt to align with a correct sharpening angle or cutting edge angle is likely to tire the hand gradually and thereby produce sharpening with a bad finish.

In view of this, the present inventor has diligently attempted a study of a construction of an ideal sharpener that is high in work efficiency, and easily and accurately enables orienting and positioning of the sharpening angle and the cutting edge angle, and that can do sharpening of (sic against) e.g. wobbling or tilting of a cutter blade during the sharpening work.

It is an object of the present invention to provide a sharpener that makes it possible, as a matter of course, to do sharpening in high efficiency by contacting, with a cutting edge, a grinding tool (round shaft file) rotated by an electric motor at a high speed, and that makes it possible to obtain an accurate sharpening angle and cutting edge angle with almost just one-touch operation of fitting a guide body into a saw chain in an orientation corresponding to a left or right cutter blade, and pushing forward its wall faces which are directed downward, and moreover that can prevent the cutter blade to be sharpened from e.g. wobbling or tilting.

To achieve the above object, the present invention provides a chainsaw sharpener with a round shaft-shaped grinding tool attached to an end of a drive shaft of a handy type electric motor, wherein mounted on and forward of the electric motor of a sharpener body via a mounting portion is a guide body having, formed therein, an upper plate face and wall faces which have a substantial X-shape as seen in plan view, extending in two directions, and which are fit into and along an upper part of the saw chain in alignment with a sharpening angle of either a left or right cutter blade of the saw chain, wherein formed at a substantially central surface of the guide body is an exposure portion made of an opening or a curved portion or both of these which make it possible to watch, from above, the grinding tool and at least a cutting edge of a cutter blade to be sharpened, and wherein provided on inside or side of the exposure portion is a guide portion for pressing, from above, the cutter blade to be sharpened so as to prevent the cutter blade from wobbling or tilting, and further to define an accurate cutting edge angle.

In a sharpening work using the sharpener of the present invention, a side of the grinding tool rotating at a high speed is brought into contact with the cutting edge of a cutter blade for grinding, with the upper plate face of the guide body being placed on an upper part of the saw chain, and with the wall faces on the near side being pressed against a guide bar (saw plate) of the chainsaw. In a saw chain, cutter blades are provided at constant intervals to face alternately left and right. Accordingly, it is necessary to change the orientation of the grinding tool depending on the sharpening of the left or right cutter blades. In the sharpener of the present invention, the guide body has an X-shape as seen in plan view according to the different orientations of the grinding tool, so that an accurate sharpening angle and cutting angle can be obtained by fitting the guide body into the saw chain from above in alignment with either of the two directions of the X-shape, and pushing it forward.

Specifically, a grinding tool is not always oriented at an accurate sharpening angle by merely fitting and placing a guide body into and on a saw chain from above, because the guide body is designed with an allowance for the front-toback width of the guide body relative to the left-to-right width of the saw chain so as to make it easy to fit the guide body into the saw chain from above. So, a design has been made that sets the two directions of the X-shape, as seen in plan view, to be directions in which the grinding tool is aligned with the sharpening angle, whereby an accurate sharpening angle and cutting edge angle can be obtained by fitting the guide body into the saw chain from above in an orientation of either direction of the X-shape in alignment with the orientation of a left or right cutter blade, and by pushing it forward. For this reason, wall faces, which are directed downward and are to be pressed against the guide bar (saw plate) for alignment with an accurate sharpening angle, are formed at a near side edge of the guide body corresponding to the X-shape as seen in plan view. By pushing the wall faces forward, the guide body is prevented from wobbling.

Note that in many kinds of chainsaws, a saw chain has a shape such that its central part slightly expands in an up-down direction. Thus, with an exposure portion, made of an opening or a curved portion to make it possible to watch a cutter blade to be sharpened and the grinding tool from above, being formed at a substantially central location in an upper surface of the guide body, it is not possible to prevent a cutter blade from wobbling or tilting due to its contact with the grinding tool rotating at a high speed. However, in the guide body of the sharpener of the present invention, a guide portion for pressing, from above, the cutter blade to be sharpened is provided on inside or side of the exposure portion so as to prevent the cutter blade from wobbling or tilting.

Further, this guide portion also has a big role to press, from above, a cutter blade to be sharpened so as to enable grinding which is aligned with a cutting edge angle of the cutter blade. In other words, the positional relationship between the guide portion and the grinding tool is defined to obtain an accurate cutting edge angle. Furthermore, this guide portion has a role, as well, to protect the face of a worker from metal power and sparks produced in the sharpening work.

The sharpener of the present invention has a structure as described above, so that it enables alignment with an accurate sharpening angle and cutting edge angle, with just an operation of fitting it from above into the saw chain in alignment with a central position of a cutter blade to be sharpened, and pushing it forward. So, even a person inexperienced in the sharpening can easily do an accurate sharpening in a short time. In this sharpener, an electric motor is used which uses a home power supply of 100V AC or uses a rechargeable battery. As an example of a preferable grinding tool, a diamond grindstone can be given which is formed of a round shaft having diamond particles fixed on an outer peripheral surface except a rear portion thereof.

The chainsaw sharpener according to the present invention enables sharpening in high efficiency, using a handy type electric motor. In particular, since the guide body has an X-shape to be able to fit into and in alignment with the sharpening angle of the left or right cutting edge of the saw chain, an accurate sharpening angle can be obtained with almost just one-touch operation of fitting the guide body into an upper part of the saw chain in alignment with a direction which is aligned with an orientation of a cutter blade to be sharpened, and pressing it against the guide bar of the chainsaw.

Furthermore, as a result of providing, on the upper plate face of the guide body, the guide portion to define an accurate cutting edge angle by pressing, from above, a cutter blade to be sharpened, it has become possible to prevent the cutter blade from wobbling or tilting and to do sharpening aligned with an accurate cutting edge angle, even when the grinding tool rotating at a high speed is brought into contact with the cutter blade to be sharpened. As a result of the above, it is possible even for a man or a woman, inexperienced in the sharpening, to do an accurate sharpening in a short time, making it unnecessary, as well, to patiently continue using a chainsaw which has become dull.

BRIEF DESCRIPTION OF DRAWINGS

FIG. 7A is a plan view showing a state of sharpening a cutter blade positioned on the left side of a saw chain (on the near side as seen from a sharpening worker), and similarly FIG. 7B is its partially enlarged view;

BEST MODE FOR CARRYING OUT THE INVENTION

Figure 1:
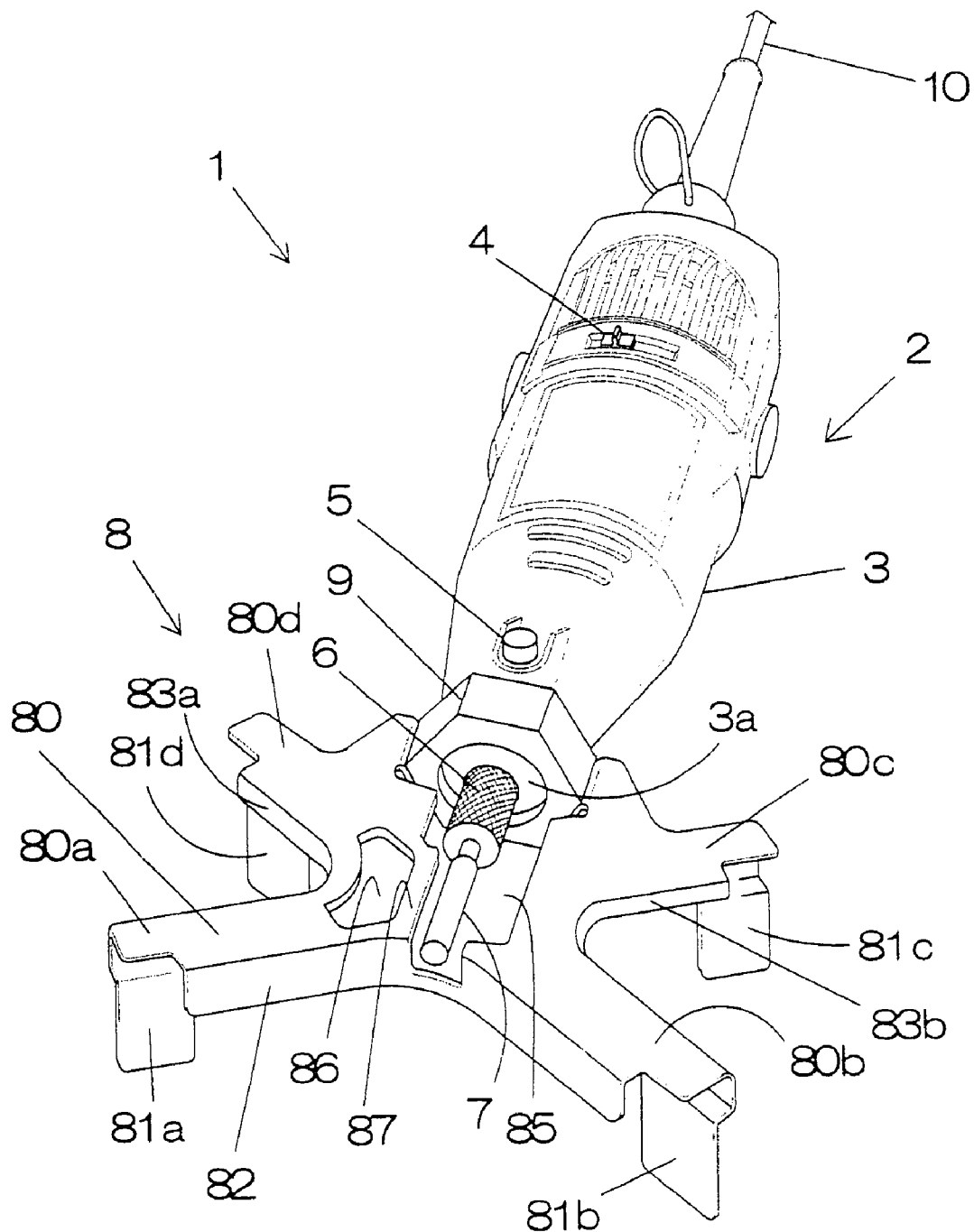
FIG. 1 is a perspective view showing a chainsaw sharpener according to an embodiment of the present invention.

A best mode for carrying out the present invention will be described hereinafter with reference to the drawings.

FIG. 1 to FIG. 6 show a chainsaw sharpener according to an embodiment of the present invention. As shown in these drawings, a chainsaw sharpener 1 according to the embodiment of the present invention is formed in a manner that a guide body 8 is detachably mounted on and forward of a sharpener body 2 which has a round shaft-shaped grinding tool 7 mounted on a front end portion of a drive shaft of an electric motor 3.

Figure 2:
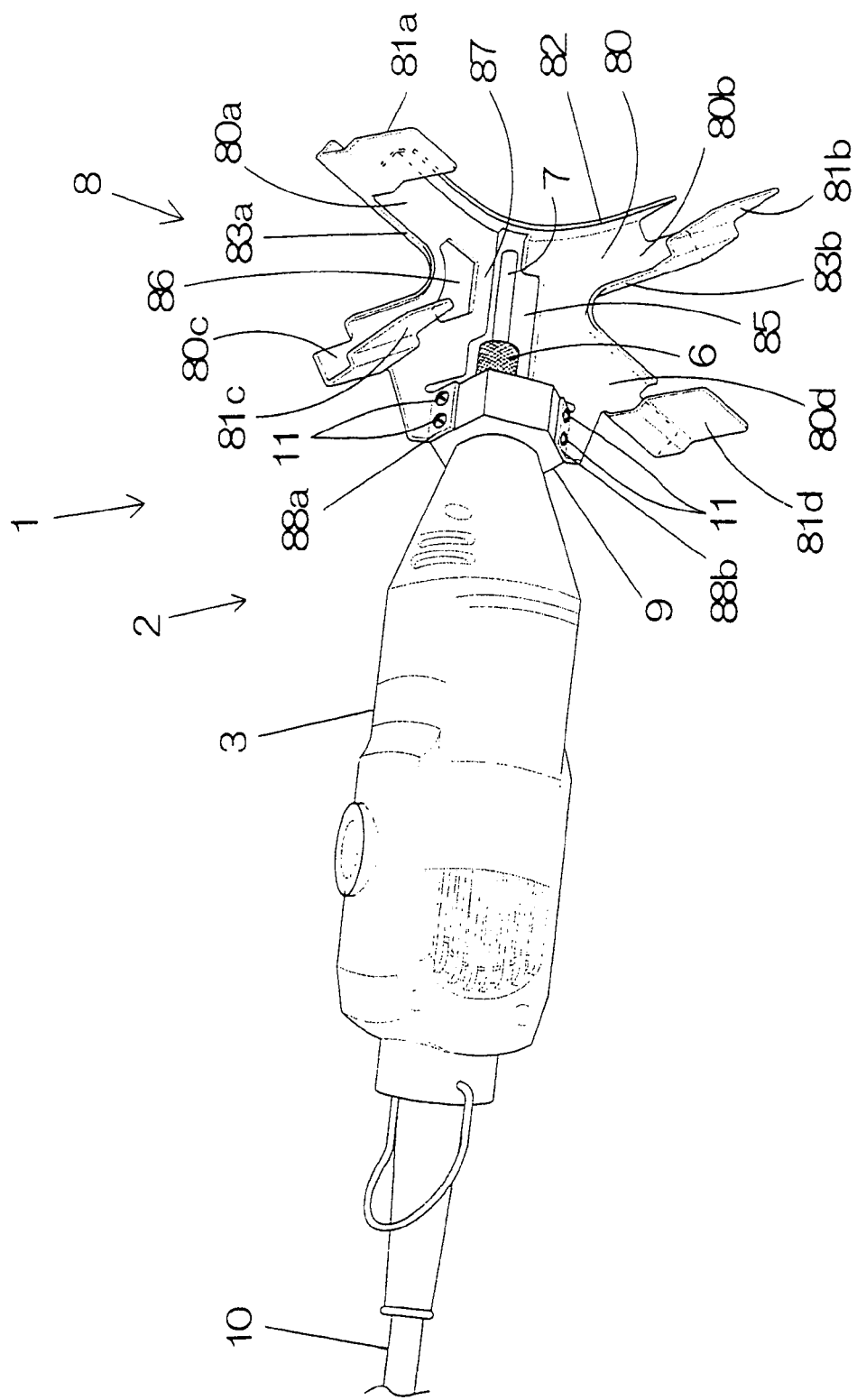
FIG. 2 is a perspective view of the sharpener as seen from diagonally below.
Figure 3:
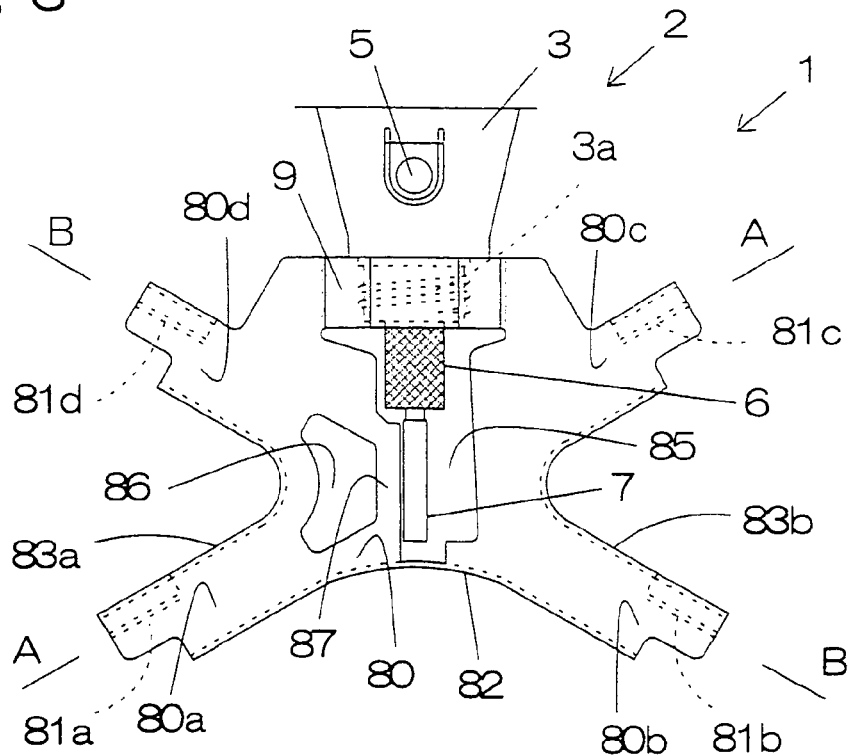
FIG. 3 is a plan view showing a main part of the sharpener.
Figure 4:
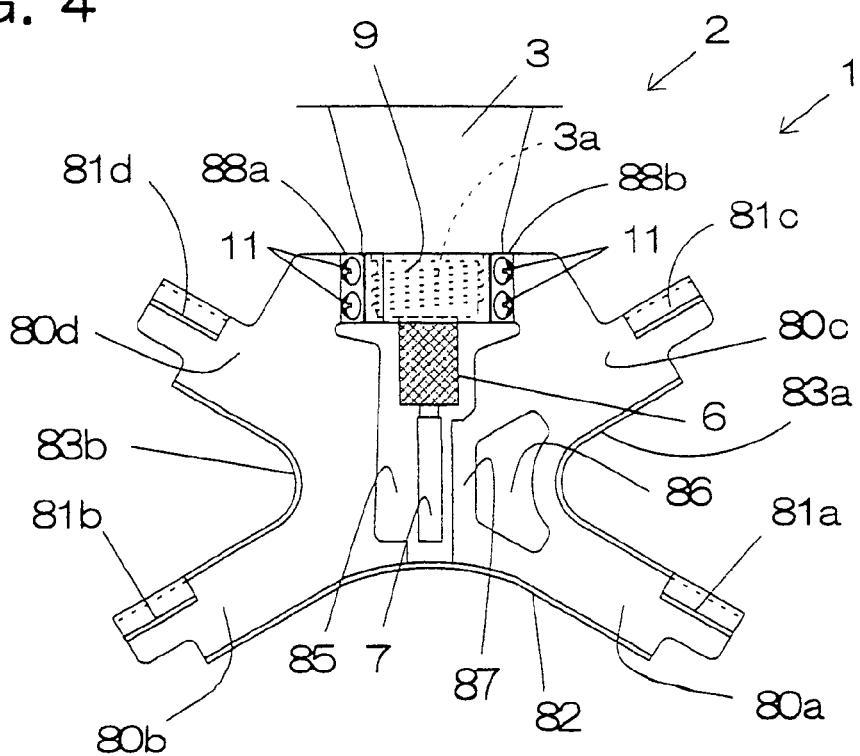
FIG. 4 is its rear view.
Figure 5:
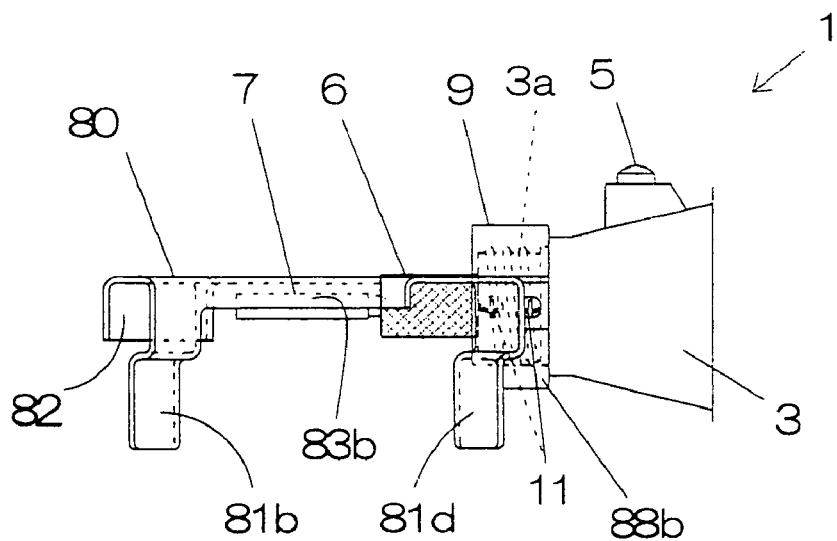
FIG. 5 is its right side view.
Figure 6:
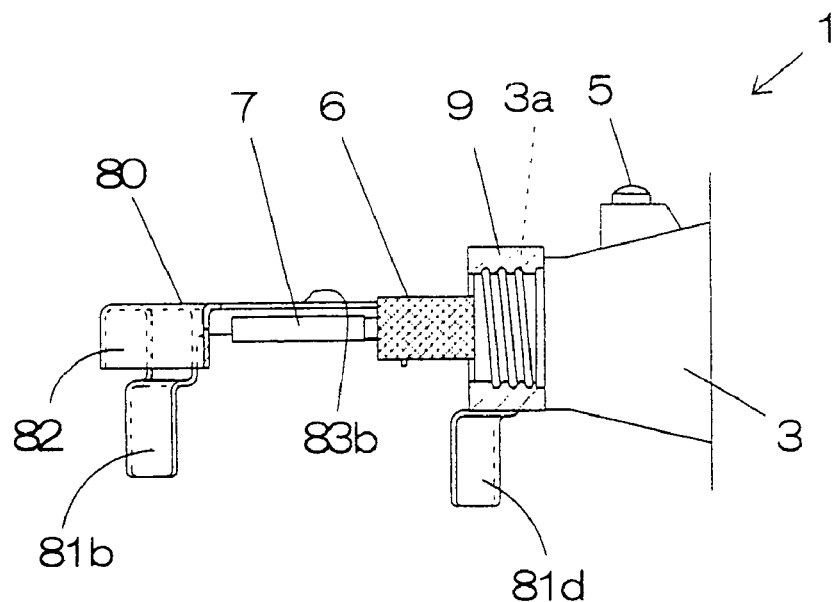
FIG. 6 is its cross-sectional side view as seen from right.

The electric motor 3 is a handy type to be driven by a DC power supply or an AC power supply, which is taken from outside, or a rechargeable battery. FIG. 1 and FIG. 2 show an electric motor 3 to be driven by a home power supply. The electric motor 3 used has a body case with a power supply switch 4 to be slided to turn the power supply on and off, and with a brake button 5 to brake the rotation of the drive shaft, and further has a power supply cord 10 extending from a rear end thereof for taking a power supply from outside.

A front part of the body case of the electric motor 3 has a narrower shape, and has a front end formed of a cylinder-shaped mounting portion 3a having a screw groove cut on an outer peripheral surface thereof for mounting the guide body 8. Using a chuck 6 mounted on the front end portion of the drive shaft of the electric motor 3, the grinding tool 7 formed of a round shaft having diamond grindstone fixed thereto is mounted, thereby forming the sharpener body 2.

As shown in FIG. 1 to FIG. 6, the guide body 8 has an upper plate face 80 having a substantial X-shape as seen in plan view. Using screws 11, 11, a mounting member 9 formed of a big nut is attached to mounting plate portions 88a, 88b which are formed at a center back part of, and tilted diagonally downward from left and right of, the upper plate face 80. The mounting member 9 is screwed onto the mounting portion of the front end of the electric motor 2 (sic 3) so that the electric motor body 2 (sic 3) and the guide body 8 are integrally assembled.

Further, each of branch faces 80a, 80b, 80c, 80d which form the upper plate face 80 of the guide body 8 is formed to be wider than the width of a saw chain 8 (sic) to some extent. For example, according to a prototype guide body 8 which the inventor has made, each of the branch faces 80a, 80b, 80c, 80d has a width of about 16 mm.

A rib 82 bent downward is formed at a position along a front edge of the two branch faces 80a, 80b which are directed diagonally forward. According to the prototype guide body 8 which the inventor has made, the rib 82 has a height of about 9 mm for example.

Further, a rib 83b bent downward is formed at a position along a right side edge of the branch faces 80b, 80c which are directed diagonally right forward and diagonally right backward as seen from the electric motor 3. Similarly, a rib 83a bent downward is formed at a position along a left side edge of the branch faces 80a, 80d, as well, which are directed diagonally left forward and diagonally left backward. According to the prototype guide body 8 which the inventor has made, these ribs 83b, 83a have a height of about 5 mm for example. The front edge and the left and right side edges as well as these ribs 82, 83b, 83a have an arc shape.

Furthermore, pressure plate faces 81a, 81b, 81d, 81c which serve as wall faces for pressing against a guide bar (saw plate) of the chainsaw, and which are directed downward, are formed on front end faces of the ribs 83a, 83b and on back end edges of the left and right branch faces 80d, 80c which are directed backward of the left and right branch faces 80b, 80a that are directed diagonally forward. Portions of these pressure plate faces 81a, 81b, 81d, 81c directed downward to partway for about two-thirds of the width of the respective branch faces 80a, 80b, 80c, 80d are directed forward, and are then directed downward. According to the prototype guide body 8 which the inventor has made, these pressure plate faces 81a, 81b, 81d, 81c have a height of about 27 mm.

Formed at a center in the left-to-right direction in the upper plate face is an exposure portion made of an opening 85 of a size which makes it possible for a sharpening worker, when sharpening, to watch the grinding tool 7 and a cutting edge of a cutter blade (not shown). Further, an exposure portion made of an opening 86 is also formed near and right of the opening 85. At a narrow portion of the upper plate face positioned between the both openings 85, 86 and extending in the front-to-back direction, a guide portion 87 is formed which is to press, from above, the cutter blade to be sharpened so as to prevent the cutter blade from wobbling or tilting due to contact between the grinding tool 7 rotating at a high speed and the cutter blade, and which is to define an accurate cutting edge angle. The guide portion 87 serves as a marker to align a side edge of the grinding tool 7 with the cutting edge of the cutter blade, and further serves to prevent metal powder produced by grinding from flying upward.

Next, referring to FIG. 7 to FIG. 12, a method of using the chainsaw sharpener 1 according to the embodiment of the present invention will be described.

Figure 8:
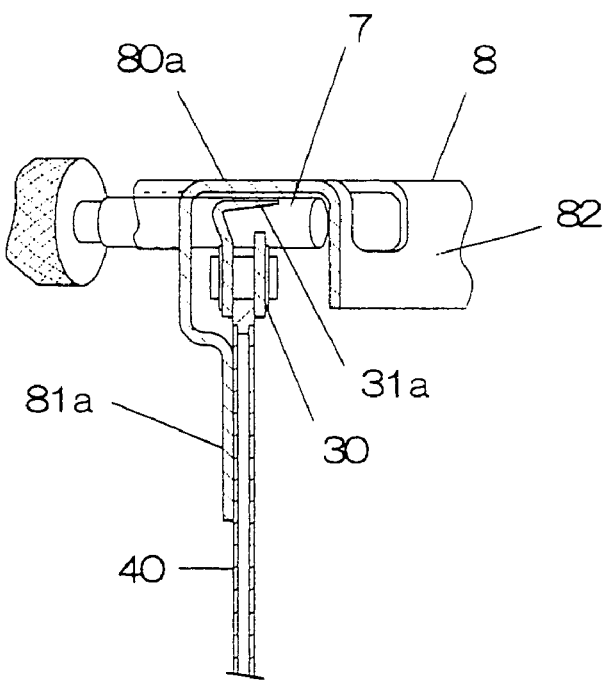
FIG. 8 is a cross-sectional side view showing a state of sharpening a cutting edge of a cutter blade on the left side.

As shown in FIG. 7A, FIG. 7B and FIG. 8, when sharpening a cutter blade 31 positioned on the left side of the saw chain (on the near side of, as seen from, the sharpening worker), align it with A-A direction of the guide body 8 and the orientation of the saw chain 30, and fit and place it into and on the saw chain 30 from under or beneath the openings 85, 86 formed at a center in the upper plate face 80.

Figure 9:
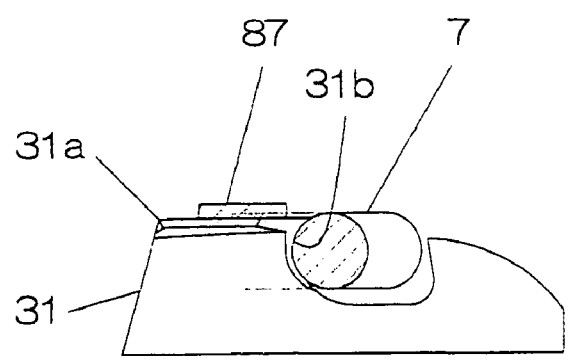
FIG. 9 is similarly a cross-sectional front view showing a state in which a cutting edge angle is defined by a grinding tool and a guide portion.
Figure 10:
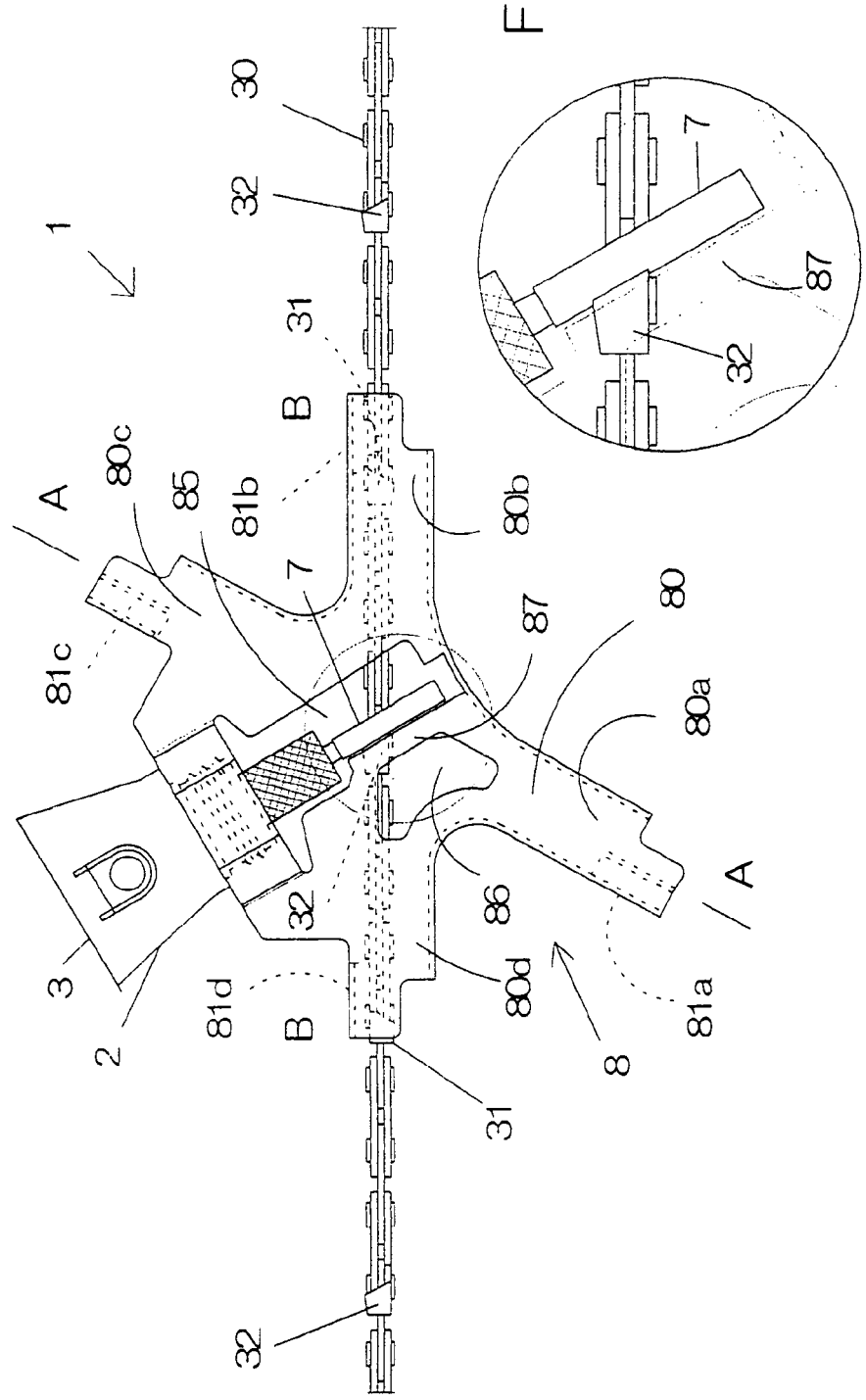
FIG. 10A is a front view showing a state of sharpening a cutter blade on the right side of the saw chain.
FIG. 10B is its partially enlarged view.

Align the position of the grinding tool 7 with a cutting edge 31b of an upper blade 31a of the cutter blade 31 on the left side, and thereafter push the entire sharpener 1 forward. Thereby, the horizontal posture of the grinding tool 7 is secured, and the sharpening angle can be accurately defined. Furthermore, as shown in FIG. 9, the upper blade 31a of the cutter blade 31 to be sharpened is pressed from above by the guide portion 87. Accordingly, the cutter blade 31 is prevented from wobbling or tilting even if the grinding tool 7 rotating at a high speed is brought into contact with the cutter blade 31.

Thus, an accurate cutting edge angle along the cutting edge 31b is accurately defined on the basis of the positional relationship between the guide portion 87 and the grinding tool 7. In this state, the cutter blade 31 on the left side is sharpened.

Figure 11:
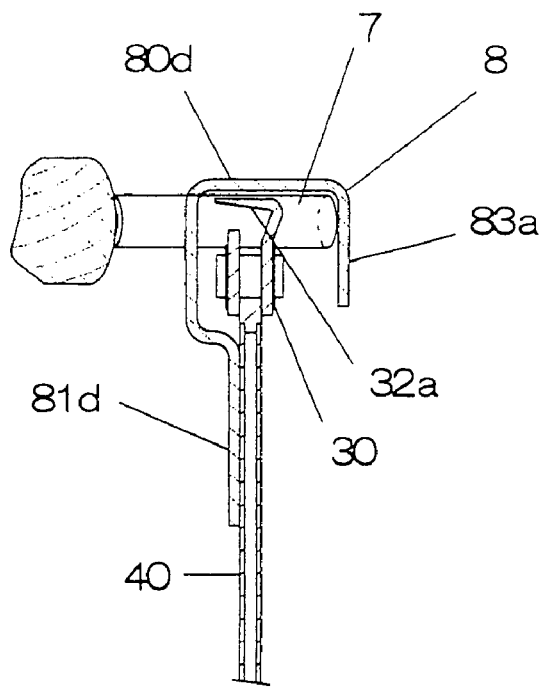
FIG. 11 is a cross-sectional side view showing a state of sharpening a cutter blade on the right side.

On the other hand, as shown in FIG. 10A, FIG. 10B and FIG. 11, when sharpening a cutter blade 32 positioned on the right side of the saw chain (on the far side of, as seen from, the sharpening worker), fit and place the branch faces 80d, 80b of the upper face 80 of the guide body 8 into and on the saw chain 30 from above the saw chain 30 in alignment with B-B direction of the guide body 8 and the orientation of the saw chain 30.

Figure 12:
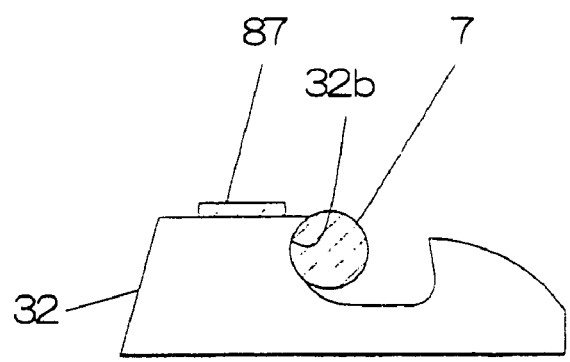
FIG. 12 is a cross-sectional front view showing a state in which a cutting edge angle is defined by the grinding tool and a guide portion.

Align the position of the grinding tool 7 with a cutting edge 32b of an upper blade 32a of the cutter blade 32 on the right side, and thereafter push the entire sharpener 1 forward. Thereby, the horizontal posture of the grinding tool 7 is secured, and the sharpening angle can be accurately defined. Furthermore, as shown in FIG. 12, the upper blade 32a of the cutter blade 32 to be sharpened is pressed from above by the guide portion 87. Accordingly, the cutter blade 32 is prevented from wobbling or tilting even if the grinding tool 7 rotating at a high speed is brought into contact with the cutter blade 32.

Thus, an accurate cutting edge angle along the cutting edge 31b (sic 32b) is accurately defined on the basis of the positional relationship between the guide portion 87 and the grinding tool 7. In this state, the cutter blade 32 on the right side is sharpened.

Note that for sharpening the left and right cutter blades 31, 32 using the sharpener 1, it is possible to alternately sharpen the left and right cutter blades 31, 32. It is also possible to first sharpen all the cutter blades 31 on the left side (or cutter blades 32 on the right side), and thereafter sharpen all the cutter blades 32 on the right side (or cutter blades 31 on the left side).

INDUSTRIAL APPLICABILITY

The chainsaw sharpener of the present invention is to sharpen the cutting edge of a saw chain provided in a chainsaw by grinding or abrading. It is small in size and easy to use, and enables sharpening of a cutter blade, aligned with an accurate sharpening angle and cutting edge angle, by just aligning the orientation of an electric motor, held by a single hand, with a horizontal direction on either left or right, and pushing it forward. Thus, even a user having no experience in sharpening a saw chain can do the sharpening well. Further, since it has a simple construction, and a construction unlikely to cause failure, it can be offered to consumers at a low price, so that not only new demand, but also replacement of conventional products can be expected.

The invention claimed is:

1. A chainsaw sharpener for a saw chain with a round shaft-shaped grinding tool (7) which is attached to an end of a drive shaft of an electric motor (3), and which receives rotation force of the electric motor (3) so as to rotate,
   wherein a guide body (8) is securely fastened on and forward of the electric motor (3) of a sharpener body (2) via a mounting plate portion 88a, 88b so that the electric motor (3) and the guide body (8) are integrally assembled; where said guide body having, formed therein, an upper plate face (80), comprising
   four branch faces 80a, 80b, 80c and 80d that are wider than a saw chain and which have a substantial X-shape as seen in plan view, extending in two directions, and which are fit into and along an upper part of the saw chain (30) in alignment with a sharpening angle of either a left or right cutter blade (31) of the saw chain (30);
   ribs 83a and 83b that are bent downward and are formed at positions along a right side edge and a left side edge respectfully of branch faces 80a, 80d and 80b, 80c; and
   wall pressure plate faces (81a, 81c, 81d, 81b) that are directed downward and that are formed on a front end faces of said ribs 83a and 83b and on back end edges of the left and right branch faces 80d, 80c and serve as wall faces for pressing against a guide bar of the chainsaw such that manually pushing said electric motor toward said guide bar (40) of the chainsaw causes either wall pressure plate faces (81a, 81c) or (81b, 81d) to press against said guide bar (40) thereby accurately aligning said grinding tool with the sharpening angle and preventing wobbling;
   wherein formed at a substantially central surface of the guide body (8) is an exposure portion made of an opening or a curved portion or both of these which make it possible to watch, from above, the grinding tool (7) and at least a cutting edge (31b, 32b) of a cutter blade (31, 32) to be sharpened, and
   wherein provided on inside or side of the exposure portion is a guide portion (87), which is a narrow portion of the upper plate face (80) extending in a front-to-back direction, so that when said guide portion (87) is pressed from above said guide portion (87) contacts and secures an upper blade (31a) of said cutter blade (31) to prevent wobbling or tilting, and to further to define an accurate cutting edge angle.

* * * * *